(12) United States Patent
Antonyraj et al.

(10) Patent No.: US 12,549,533 B2
(45) Date of Patent: Feb. 10, 2026

(54) STATELESS APPLICATION LAYER USER SESSION TRACKING

(71) Applicant: Palo Alto Networks, Inc., Santa Clara, CA (US)

(72) Inventors: Rosarin Jolly Roy Antonyraj, Santa Clara, CA (US); Badrinath Natarajan, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 49 days.

(21) Appl. No.: 18/759,163

(22) Filed: Jun. 28, 2024

(65) Prior Publication Data

US 2026/0006017 A1    Jan. 1, 2026

(51) Int. Cl.
*H04L 9/40* (2022.01)

(52) U.S. Cl.
CPC ........ *H04L 63/0807* (2013.01); *H04L 63/166* (2013.01)

(58) Field of Classification Search
CPC .................... H04L 63/0807; H04L 63/166
See application file for complete search history.

(56) References Cited

U.S. PATENT DOCUMENTS

| 9,124,629 B1* | 9/2015 | Bowen | H04L 63/045 |
| 10,069,800 B2* | 9/2018 | Lu | H04L 65/1069 |
| 10,250,596 B2* | 4/2019 | Hsu | H04L 67/145 |
| 10,554,689 B2* | 2/2020 | Reddy | H04L 9/0827 |
| 2018/0351997 A1* | 12/2018 | Lee | H04L 9/3263 |

OTHER PUBLICATIONS

Salowey, et al., "Transport Layer Security (TLS) Session Resumption without Server-Side State", [online], [retrieved on May 21, 2024] Retrieved from the Internet: https://datatracker.ietf.org/doc/html/rfc5077>.

* cited by examiner

*Primary Examiner* — Amie C. Lin
(74) *Attorney, Agent, or Firm* — Gilliam IP PLLC

(57) ABSTRACT

This disclosure provides for server-side application layer session tracking by leveraging the TLS ticket mechanism. Assuming a client indicates support for a TLS ticket when establishing a transport layer session, a server creates a TLS ticket for the transport layer session and conveys in the TLS ticket to the client an identifier used for application layer session tracking. When the client resumes a transport layer session with the TLS ticket, a server extracts from the TLS ticket the identifier and indicates or makes available the identifier application layer session tracking.

20 Claims, 5 Drawing Sheets

STATELESS APPLICATION LAYER USER SESSION TRACKING

BACKGROUND

The disclosure generally relates to the transport layer security protocol (e.g., CPC class H04L 63) and application layer session tracking (e.g., CPC class G06F 11).

The Transport Layer Security (TLS) protocol is defined to provide a secure channel between communicating peers (e.g., a client and a server). The TLS protocol relies upon a reliable, underlying transport (e.g., Transmission Control Protocol). The TLS protocol specifies that a TLS implementation should provide authentication, confidentiality, and integrity. TLS version 1.3 is specified in Request for Comments (RFC) 8446. Version 1.3 of the TLS protocol (hereinafter TLS 1.3) includes two sub-protocols: 1) a handshake protocol and 2) a record protocol. The handshake sub-protocol specifies that peers negotiate a protocol version, select cryptographic algorithms, authenticate at least the responding peer (optionally the peers authenticate each other), and establish a shared secret. After the handshake is complete, the peers communicate application-layer traffic according to the record sub-protocol using the established shared secret to protect the application-layer traffic.

The introduction section for the Internet Engineering Task Force (IETF) RFC 5077, entitled "Transport Layer Security (TLS) Session Resumption without Server-Side State," describes a way to resume a TLS session without requiring session-specific state at a server. RFC 5077 defines an additional handshake message to communicate a new "TLS session ticket" or ticket renewal and uses a TLS extension for a client to indicate support of a TLS session ticket and to convey a TLS session ticket if already possessed by the client. The server creates a TLS session ticket with its session state and encrypts the ticket prior to sending to a client.

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Overview

Server-side application layer user session tracking facilitates behavior tracking for cybersecurity behavioral pattern building, A/B testing, detecting anomalous activity, e-Commerce applications, and other technologies. User session tracking has historically relied upon cookies. However, browser settings are available to block cookies, and providers of popular browsers have announced a termination of support for cookies. Web socket messages or other protocols not based on hypertext transfer protocol (HTTP), such as remote desktop protocol (RDP) and the secure shell network protocol (SSH), could be used for application layer user session tracking, though these HTTP alternatives increase complexity and lack the ubiquity of HTTP browsers.

This disclosure provides for server-side application layer session tracking by leveraging the TLS ticket mechanism. Assuming a client indicates support for a TLS ticket when establishing a transport layer session, a server creates a TLS ticket for the transport layer session and conveys in the TLS ticket to the client an identifier used for application layer session tracking. When the client resumes a transport layer session with the TLS ticket, a server extracts from the TLS ticket the identifier and indicates or makes available the identifier application layer session tracking.

Example Illustrations

Figure 1:
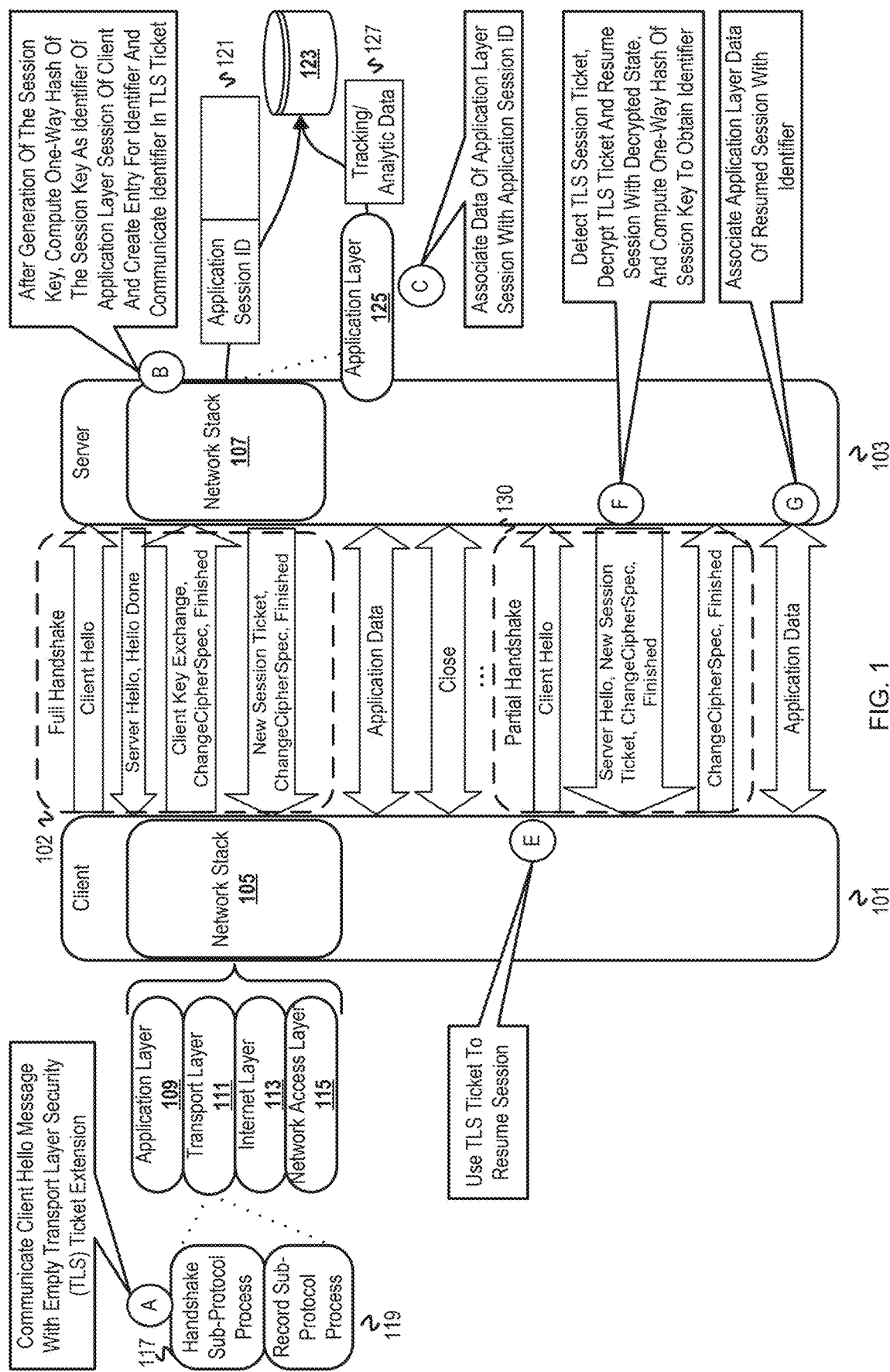
FIG. 1 is a conceptual diagram of application layer session tracking with TLS ticketing.

FIG. 1 is a conceptual diagram of application layer session tracking with TLS ticketing. The conceptual diagram illustrates the exchange of messages during a full TLS handshake 102 and a subsequent partial TLS handshake 130 that include conveying an identifier with a TLS ticket for application layer session tracking. FIG. 1 depicts a set of peers communicating with each other to establish a TLS connection with these handshakes 102, 130 and securely communicate over the established connection. The peers include client 101 and server 103. The client 101 and server 103 respectively host network stacks 105, 107. The network stack 105 is illustrated with an application layer 109, transport layer 111, Internet layer 113, and network access layer 105. The network stack 105 can be configured with different layers, which can involve different sets of communication protocols, but at least includes a layer(s) corresponding to TLS. The network stack 105 includes program code that implements protocols corresponding to the transport layer 111. In this case, the network stack 105 includes program code that implements TLS. This program code includes program code for the handshake sub-protocol and program code for the record sub-protocol. When the network stack 105 is instantiated, a handshake sub-protocol process 117 is instantiated and a record sub-protocol process 119 is instantiated. The handshake sub-protocol includes establishing connection parameters, agreeing on cipher suites, authentication of the peers, and establishment of a shared secret. The establishing of connection parameters overlaps with agreeing on the cipher suites since the initial client hello messages lists out cipher suites supported by the initiating peer (client 101). The initial message also specifies a TLS version as one of the connection parameters. The initial parameters communicated from the client also include a client random number. The responding peer (server 103) responds with selection of offered cipher suites for key exchange, selection of extensions, and the server random number. In addition, the server signs the response with a signature algorithm chosen from the cipher suites offered by the client.

The description of the network stack 105 generally applies to the network stack 107, but details of the layers are not illustrated due to space constraints in the drawing sheet. However, FIG. 1 depicts an application layer 125 of the network stack 107 due to the use of a session tracking identifier at the server 103.

As part of the full handshake 102, FIG. 1 depicts the exchange of messages between the client 101 and the server 103. The messages include the client Hello message, server Hello and Hello Done message, key exchange, ChangeCipherSpec messages, and Finished messages. The full handshake 102 also includes the server 103 providing a new TLS ticket to the client 101 in a New Session Ticket message. The partial handshake 130 includes exchange of the Client Hello message, the Server Hello message, the server's 103 ChangeCipherSpec and Finished messages, and the client's 101 ChangeCipherSpec and Finished messages. The messages relevant to the TLS ticket exchange will be referenced in the description of stages.

FIG. 1 is annotated with a series of letters A-F for stages, each stage representing one or more operations. Although these stages are ordered for this example, the stages illustrate one example to aid in understanding this disclosure and should not be used to limit the claims. Subject matter falling within the scope of the claims can vary from what is illustrated.

At stage A, the handshake sub-protocol process 117 communicates a client Hello message with an empty TLS ticket extension. The inclusion of the empty TLS ticket extension communicates to the server 103 that the client 101 supports TLS ticketing.

At stage B, the server 103 creates an identifier for application layer session tracking. After generation of a TLS session key, the server 103 computes a one-way hash of the session key. The one-way hash of the session key will be used as the identifier for tracking the application layer session. The server 103 communicates the identifier in the New Session Ticket message sent to the client 101. The server 103 creates an entry 121 in a database 123. The entry 121 indexed or accessible with the application layer session identifier is used for application layer data collected for tracking the application layer session. The database 123 is accessible by the application layer 125, either directly or indirectly (e.g., via an application programming interface (API)). The entry 121 or identifier for the application layer session is indicated to the application layer 125, meaning it is communicated to the application in the application layer 125 for which the TLS connection has been established.

At stage C, the application in the application layer 125 associates application data of interest communicated in the TLS session with the application layer session identifier. The application in the application layer 125 (or an associated analytics/tracking process) extracts application data of interest from messages/payloads and stores the extracted data in the entry 121 of the database 123.

At some point, the TLS session is closed between the client 101 and the server 103. This may be due to a timeout or a user navigating to a different location, as examples. Stages D-F correspond to resumption of a session that was closed.

At stage D, the handshake sub-protocol process 117 of the client 101 uses the TLS ticket that was previously communicated from the server 103 to resume the TLS session that was closed. The handshake sub-protocol process 117 create the client Hello message with the previously communicated TLS ticket in the extension field.

At stage E, the server 103 resumes the session with TLS session ticket and processes the TLS session ticket to extract the application layer session identifier. The server 103 detects the TLS session ticket in the client Hello message and decrypts the TLS session ticket extracted from the client Hello message. The server 103 then resumes the TLS session based on the state indicated in the decrypted TLS ticket. The session state includes contextual information for the session (e.g., compression and padding settings, initialization vector, record sequence numbers, cipher suite information). In addition to the TLS session state, the server 103 computes a one-way hash of the session key of the resumed session to obtain the application layer session identifier.

At stage F, the application data of interest communicated in the resumed TLS session is associated with the application layer session identifier. When data of interest is detected, that application data is associated with the entry 121 in the database 123 with the application layer session identifier.

Figure 2:
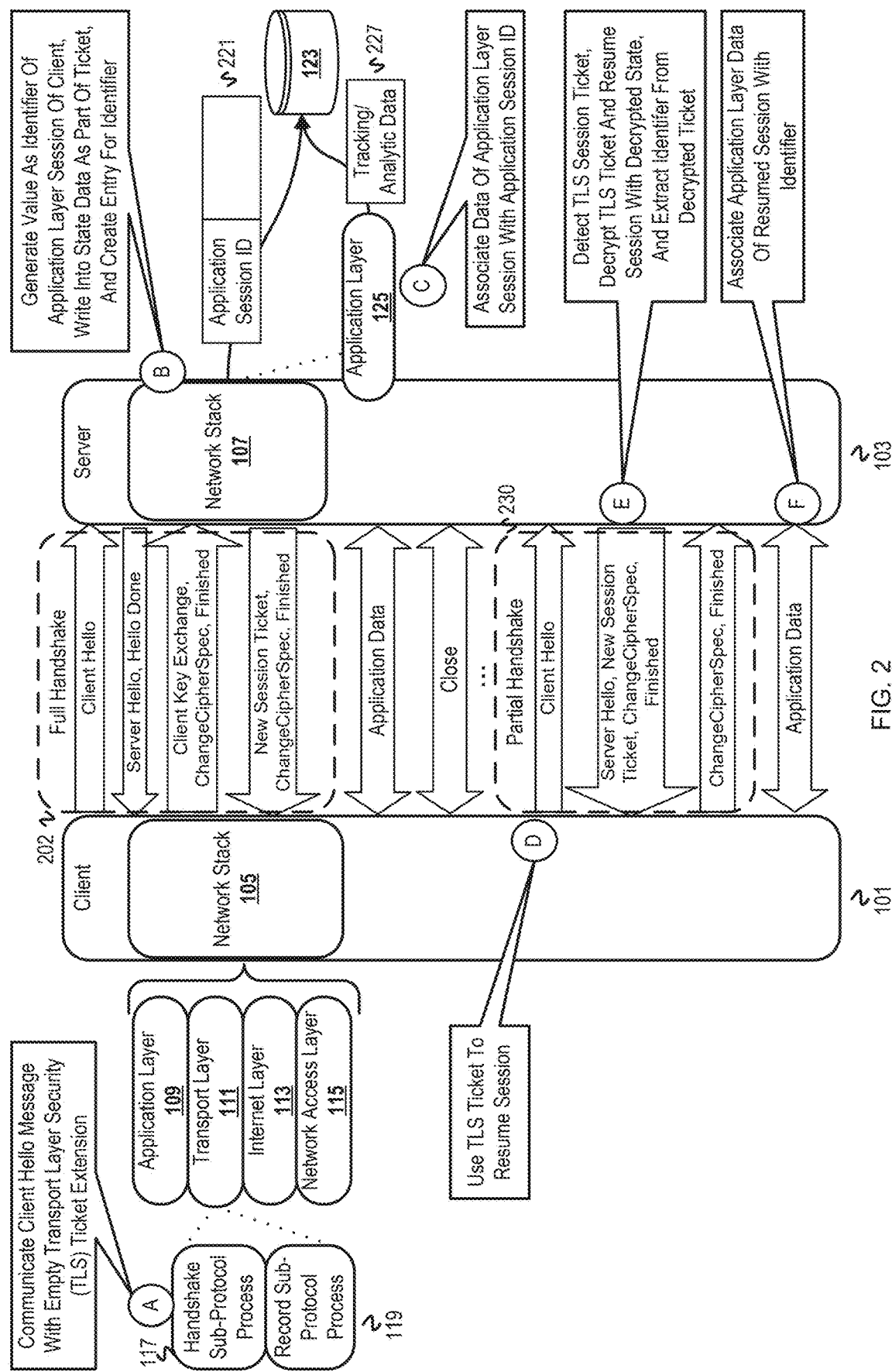
FIG. 2 is a conceptual diagram of application layer session tracking with TLS ticketing.

FIG. 2 is a conceptual diagram of application layer session tracking with TLS ticketing. Instead of basing the application layer session identifier on the TLS session key, the example in FIG. 2 generates an identifier independent of the TLS session but communicated with the TLS ticket. The majority of the description for FIG. 2 would be the same as the description of FIG. 1. For brevity, the description is minimized to reduce redundancy.

The conceptual diagram illustrates the exchange of messages during a full TLS handshake 202 and a subsequent partial TLS handshake 230 that include conveying an identifier with a TLS ticket for application layer session tracking. As in FIG. 1, the client 101 has the network stack 105 which includes the layers 109, 111, 113, 115. Likewise, the server 103 includes the network stack 107 which includes the application layer 125.

As part of the full handshake 202, FIG. 2 depicts the exchange of messages between the client 101 and the server 103. The messages include the client Hello message, server Hello and Hello Done message, key exchange, ChangeCipherSpec messages, and Finished messages. The full handshake 202 also includes the server 103 providing a new TLS ticket to the client 101 in a New Session Ticket message. The partial handshake 230 includes exchange of the Client Hello message, the Server Hello message, the server's 103 ChangeCipherSpec and Finished messages, and the client's 101 ChangeCipherSpec and Finished messages. The messages relevant to the TLS ticket exchange will be referenced in the description of stages.

FIG. 2 is annotated with a series of letters A-F for stages, each stage representing one or more operations. Although these stages are ordered for this example, the stages illustrate one example to aid in understanding this disclosure and should not be used to limit the claims. Subject matter falling within the scope of the claims can vary from what is illustrated.

At stage A, the handshake sub-protocol process 117 communicates a client Hello message with an empty TLS ticket extension.

At stage B, the server 103 creates an identifier for application layer session tracking. The server 103 randomly generates an identifier within a predefined bound (e.g., 32 bytes). For instance, the server 103 uses a pseudo-random number generator. The server 103 communicates the generated identifier in the New Session Ticket message sent to the client 101. The server 103 creates an entry 221 in the database 123. The entry 221 is indexed or accessible with the generated identifier and is used for collecting application layer data for tracking the application layer session.

At stage C, the application in the application layer 125 associates application data of interest communicated in the TLS session with the application layer session identifier.

At stage D, the handshake sub-protocol process 117 of the client 101 uses the TLS ticket that was previously communicated from the server 103 to resume the TLS session after it was closed. The handshake sub-protocol process 117 create the client Hello message with the previously communicated TLS ticket.

At stage E, the server 103 extracts the TLS session ticket from the client Hello message and resumes the session based on the state data in the TLS session ticket after decrypting the TLS session ticket. The server 103 also extracts the application layer session identifier from the decrypted TLS session ticket.

At stage F, the application data of interest communicated in the resumed TLS session is associated with the application layer session identifier. When data of interest is detected, that application data is associated with the entry 221 in the database 123 with the application layer session identifier.

Although FIGS. 1 and 2 depict resumption of a TLS session with a same server, there are many cases in which the TLS session is resumed with a different server. For instance, network traffic for an application may be load balanced across multiple servers. Thus, implementations would create the database of application layer session identifiers to be accessible and/or shared by the servers that host instances of the application.

Figure 3:
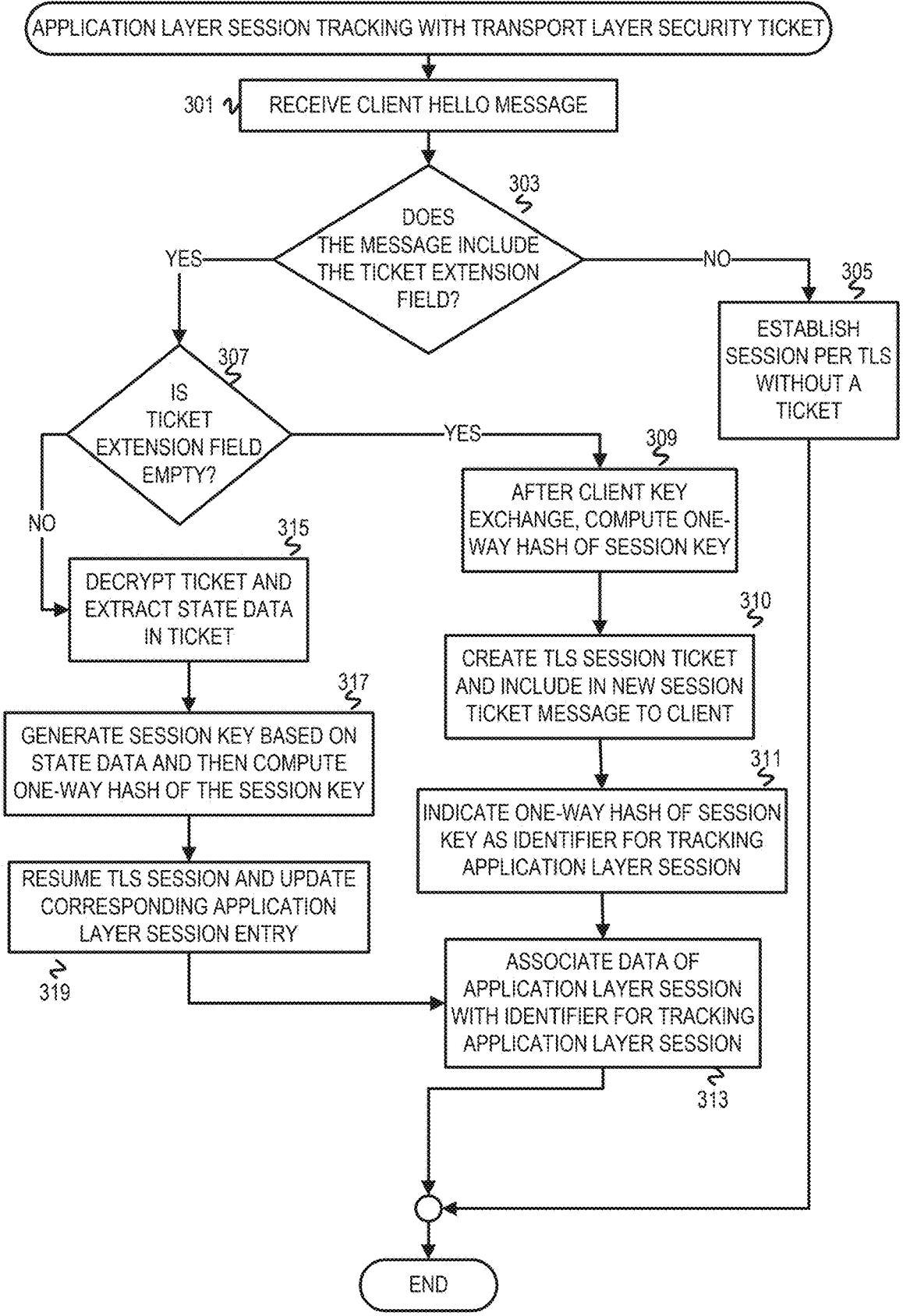
FIG. 3 is a flowchart of example operations for application layer session tracking with a TLS ticket.
Figure 4:
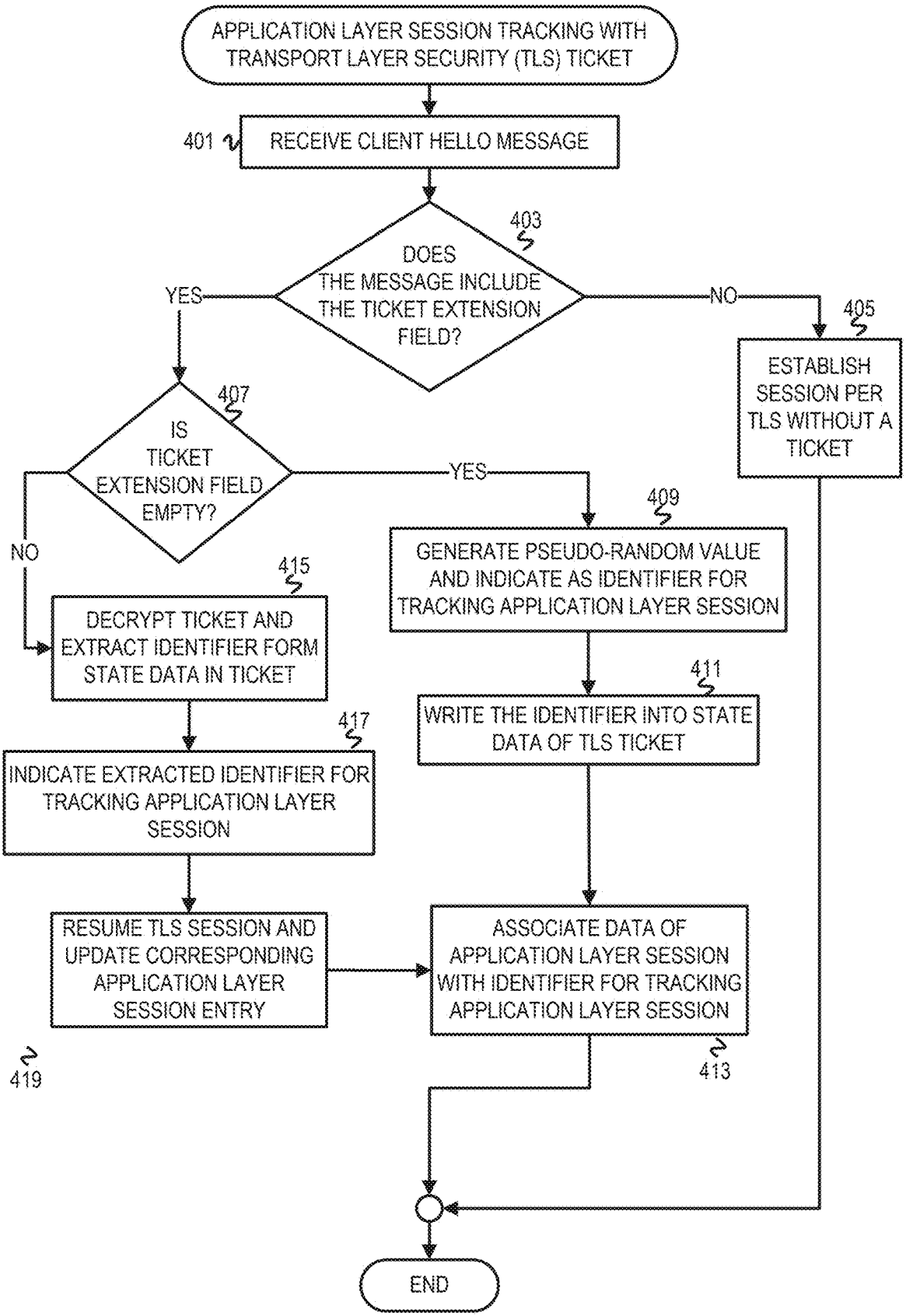
FIG. 4 is a flowchart of example operations for application layer session tracking with a TLS ticket.

FIGS. 3 and 4 are flowcharts corresponding to the different approaches for using TLS ticketing for application layer session tracking. The example operations are described with reference to a server, which can be a physical server or software server. The operations are described with reference to a server for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for application layer session tracking with a TLS ticket. The operations of FIG. 3 leverage the TLS session key for the application layer session identifier and communicate it with the TLS session ticket. Similar to the descriptions of FIGS. 1 and 2, the example operations do not go into the details of the TLS handshake which are well established.

At block 301, a server receives a client hello message. The server receives the client hello message as part of a TLS handshake to establish a TLS session.

At block 303, the server determines whether the client hello message includes the extension field for a TLS session ticket. The server parses the client hello message to determine whether the field is present. If the client hello message includes the extension field for a TLS session ticket, then operational flow proceeds to block 307. Otherwise, operational flow proceeds block 305.

At block 305, the server establishes a session per TLS without a ticket. Operational flow ends after block 305. Ending of operational flow is merely with respect to establishing the TLS session since communication is likely to continue for transmission of application data.

At block 307, the server determines whether the ticket extension field is empty. Inclusion of the ticket extension field with an empty value indicates support of TLS ticketing. If the ticket extension field is empty, then operational flow proceeds to block 309. If a value is assigned to the ticket extension field, then operational flow proceeds to block 315.

At block 309, the server computes a one-way hash of the session key or key material after client key exchange. The one-way hash can be of the symmetric key the server uses for the TLS session or material for computing the key, such as the master secret. Computing a one-way hash of the key/key material allows the application layer session to be tracked leveraging the existing key associated with the TLS session underlying the application layer session, while preserving the security of the key (e.g., not storing the raw key in memory or in a persistent database).

At block 310, the server creates a TLS session ticket and includes the session ticket in the new session ticket message that the server sends to the client. The RFC 5077 defines a structure for a New Session Ticket message which is reproduced below.
  struct {
    uint32 ticket_lifetime_hint;
    opaque ticket<0 . . . 2^16-1>;
  } NewSession Ticket;
RFC 5077 also provides a recommended structure for the
  TLS session ticket.
  struct {
    opaque key_name [16];
    opaque iv [16];
    opaque encrypted_state<0 . . . 2^16-1>;
    opaque mac [32];
  } ticket;
The RFC 5077 explains that the field key_name identifies a set of keys used by the server to protect the ticket. This allows the server to recognize keys it has generated and to retrieve the keys as part of TLS session resumption. The encrypted_state field will be assigned the encrypted state data of the TLS session. In terms of the RFC 5077, the encrypted_state field will be assigned an encrypted version of StatePlaintext having the below recommended structure.
  struct {
    ProtocolVersion protocol_version;
    CipherSuite cipher_suite;
    CompressionMethod compression_method;
    opaque master_secret [48];
    ClientIdentity client_identity;
    uint32 timestamp;
  } StatePlaintext;

At block 311, the server indicates the one-way hash of the session key as an identifier for tracking an application layer session associated with the TLS session. Indication of the one-way hash depends on implementation of communication with the application layer. For instance, the application layer session identifier can be written to a database of application layer session identifiers accessible by a specified set of applications. Applications can request application layer session identifiers via an API with the network stack or transport layer. The network stack or program code corresponding to the transport layer that implements TLS can expose an API to higher layers with the underlying TLS library. For example, a callback function of the API can cause an application to lookup an application layer session identifier or cause the TLS process to lookup the session identifier and communicate the session identifier to the process. For instance, a function can be triggered when a client presents a TLS ticket for session resumption or when a server creates a ticket to present to the application corresponding to the session either being established or resumed an application layer session identifier for the client.

At block 313, the server associates data of the application layer session with the application layer session identifier for tracking some aspect the application layer session, such as behavior or navigation events. While the operations refer to the server, the operations are handled by different software on the server. All operations in FIG. 3 are performed by a process(es) that implements TLS. The association of data for tracking is performed by the application corresponding to the application data or a tracking/analysis application given permission by the application for application layer session tracking. Operational flow ends after block 313 with respect to the establishment of the TLS session as it relates to using TLS session ticket for application layer session tracking. Data will continue to be associated for application layer session tracking until the TLS session closes.

If the TLS ticket extension field was not empty in the client hello message (block 307), then the server decrypts the TLS session ticket and extracts state data from the decrypted ticket at block 315. The extracted state data is used to resume the TLS session.

At block 317, the server generates a session key based on the state data (i.e., using the master secret in the state data) and then computes a one-way hash of the session key (or key material). The server would generate the session key as part of TLS session resumption. Thus, computation of the one-way hash can be incorporated into the key computation process or triggered by the key computation process.

At block 319, the server resumes the TLS session. In addition, the server updates a corresponding application layer session entry in the database of application layer session identifiers. Embodiments can implement aging for maintenance of the database or listing of application layer session identifiers. Implementations that age entries can maintain an age value for each entry and periodically evaluate age of entries for removal or marking as inactive. Maintenance operations on the database may have marked a previous entry with the application session layer identifier as stale or for removal based on an aging criterion. If an entry is marked for removal and the server searches the database and hits an entry marked for removal, then the server can treat it as a miss. If there is no matching entry, then a new entry can be created. Operational flow proceeds from block 319 to block 317.

FIG. 4 is a flowchart of example operations for application layer session tracking with a TLS ticket. The operations of FIG. 4 leverage insertion of an application layer session identifier into a TLS session ticket. Since many of the operations are substantially similar with FIG. 3, the description is minimized to reduce redundancy. At block 401, a server receives a client hello message. At block 403, the server determines whether the client hello message includes the extension field for a TLS session ticket. If the client hello message includes the extension field for a TLS session ticket, then operational flow proceeds to block 407. Otherwise, operational flow proceeds to block 405. At block 405, the server establishes a session per TLS without a ticket. Operational flow ends after block 405. At block 407, the server determines whether the ticket extension field is empty. If the ticket extension field is empty, then operational flow proceeds to block 409. If the ticket extension field is not empty, then operational flow proceeds to block 415.

At block 409, the server generates a pseudo-random value and indicates the value as an identifier (hereinafter "group ID") for tracking an application layer session conveyed by the TLS session. This can be a random N bit value. Use of a group ID instead of deriving an identifier from a session key avoids the challenge presented by a key renegotiation. With a group ID, the same group ID would propagate regardless of key renegotiation. Indicating the group ID would be exposing the group ID for application layer session tracking to the corresponding application or another permitted application.

At block 411, the server writes the group ID into the state data of the ticket. A TLS session state data is implemented with a field to accommodate the group ID. The recommended structure of StatePlaintext could be modified as indicated below.
```
struct {
    ProtocolVersion protocol_version;
    CipherSuite cipher_suite;
    CompressionMethod compression_method;
    opaque master_secret [48];
    ClientIdentity client_identity;
    uint32 groupID
    uint32 timestamp;
} StatePlaintext;
```
At block 413, the server associates data of the application layer session with the group ID for tracking some aspect of the application layer session. Operational flow ends after block 413 with the exception of the continued association of data with the group ID while the session is active.

If the TLS ticket extension field was not empty in the client hello message (block 407), then the server decrypts the TLS session ticket and extracts state data from the decrypted ticket at block 415. From the state data, the server extracts the group ID. At block 417, the server indicated the extracted group ID for tracking the corresponding application layer session. At block 419, the server resumes the TLS session and updates a corresponding application layer session entry in the database of application layer session identifiers. Operational flow proceeds from block 419 to block 417.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 309 and 310 can be performed in parallel or in a different order that illustrated. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
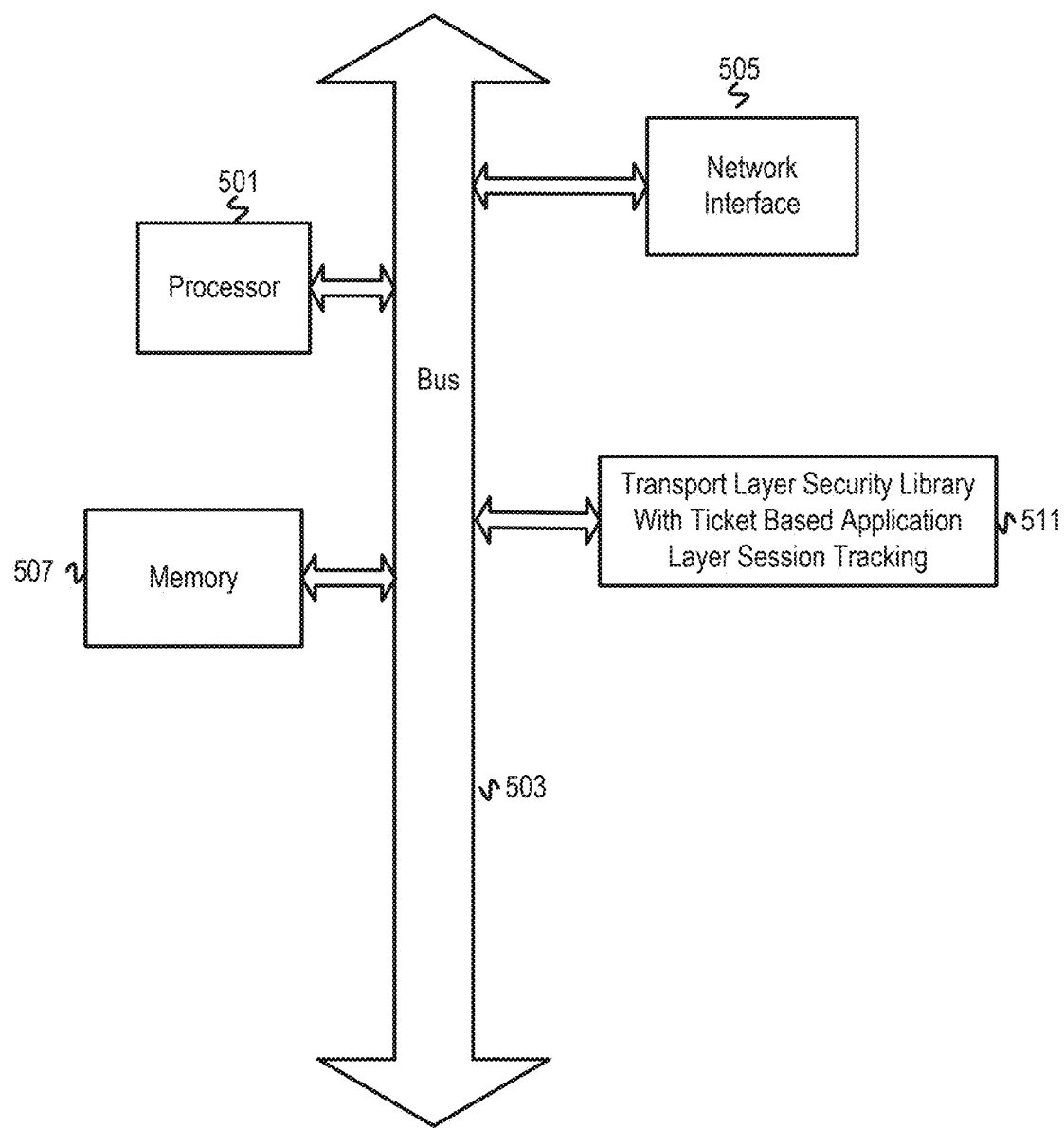
FIG. 5 depicts an example computer system with TLS ticket based application layer session tracking.

FIG. 5 depicts an example computer system with TLS ticket based application layer session tracking. The computer system includes a processor 501 (possibly including multiple processors, multiple cores, multiple nodes, and/or implementing multi-threading, etc.). The computer system includes memory 507. The memory 507 may be system memory or any one or more of the above already described possible realizations of machine-readable media. The computer system also includes a bus 503 and a network interface 505. The system also includes TLS library 511. The TLS library 511 is invoked to establish TLS connections/sessions. The TLS library 511 includes functions to leverage TLS session ticketing for application layer session tracking as described earlier. The TLS library 511 implements TLS session ticketing to communicate a group ID for application layer session tracking or relies on the session key and resumption mechanism for application layer session tracking. The TLS library 511 also includes an API to expose application layer session identifiers derived from TLS ticketing or relying on state data of TLS tickets. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method of tracking state of an application layer session across resumed transport layer security (TLS) sessions with TLS session ticketing comprising:
    determining whether a client hello message for establishing a TLS session includes a TLS ticket;
    based on a determination that the client hello message includes a TLS session ticket field with a TLS session ticket, a server deriving an identifier of the application layer session based on the TLS session ticket;
        indicating the derived identifier for tracking state of the application layer session;
        resuming the TLS session and updating an entry in a database of application session identifiers with the derived identifier, wherein the entry corresponds to the resumed application layer session;
    based on a determination that a client message indicates support of TLS session ticketing but does not include a TLS session ticket when establishing the TLS session, the server generating an identifier for the application layer session of the client and communicating an indication of the generated identifier to the client;
        indicating the generated identifier for tracking state of the application layer session;
        writing an indication of the generated identifier or the generated identifier into state data of the TLS session that will be used to construct a TLS ticket;
        communicating the constructed TLS ticket to the client; and
    associating application layer data of the client communicated with the TLS session with an application layer session identifier, wherein the application layer session identifier is either the derived identifier or the generated identifier.

2. The method of claim 1, wherein deriving the identifier of the application layer session of the client from the TLS session ticket comprises:
    decrypting the TLS session ticket;
    determining a TLS session key based on state data extracted from the TLS session ticket;
    generating a one-way hash of the TLS session key; and
    indicating the one-way hash of the TLS session key as the identifier of the application layer session.

3. The method of claim 1, wherein generating the identifier for the application layer session of the client comprises generating as the application layer session identifier a one-way hash of a TLS session key for the TLS session, wherein communicating an indication of the application layer session identifier to the client comprises communicating the TLS session ticket.

4. The method of claim 3 further comprising maintaining a database of one-way hashes of TLS session keys paired with application layer data, wherein associating the application layer data of the client with the application layer session identifier comprises querying the database to determine an entry in the database for the application layer session identifier.

5. The method of claim 1, wherein generating the identifier for the application layer session of the client comprises pseudo-randomly generating a value, indicating the value as the application layer session identifier, writing the value into state data of the TLS session ticket, wherein communicating to the client comprises communicating the TLS session ticket with the value written into the TLS session ticket.

6. The method of claim 5, wherein deriving the identifier of the application layer session of the client from the TLS session ticket comprises:
 decrypting the TLS session ticket; and
 extracting the value from state data within the TLS session ticket.

7. The method of claim 6 further comprising copying the value into state data before constructing another TLS session ticket for a response to the client.

8. A non-transitory, machine-readable medium having program code stored thereon, the program code comprising instructions that when executed by a processor, cause the processor to:
 track state of an application layer session across resumed transport layer security (TLS) sessions with TLS session ticketing, wherein the instructions to track state of an application layer session comprise instructions to,
  determine whether a client hello message for establishing a TLS session includes a TLS ticket;
  based on a determination that the client hello message includes a TLS ticket field with a TLS ticket when establishing the TLS session, determine an identifier for the application layer session based on the TLS ticket;
   indicate the determined identifier for tracking state of the application layer session; and
   resume the TLS session and update an entry in a database of application session identifiers with the determined identifier, wherein the entry corresponds to the application layer session;
  based on a determination that the client hello message indicates support of TLS session ticketing but does not include a TLS ticket when establishing a TLS session, generate an identifier for the application layer session;
   indicate the generated identifier for tracking state of the application layer session;
   write an indication of the generated identifier or the generated identifier into state data of the TLS session that will be used to construct a TLS ticket;
   communicate the constructed TLS ticket to a client; and
  associate application layer data of the client communicated with the TLS session with an application layer session identifier, wherein the application layer session identifier is either the determined identifier or the generated identifier.

9. The machine-readable medium of claim 8, wherein the instructions to determine an identifier for the application layer session based on the TLS ticket comprise instructions to:
 decrypt the TLS ticket;
 determine a TLS session key or key material based on state data extracted from the TLS ticket;
 generate a one-way hash of the TLS session key or key material; and
 indicate the one-way hash as the identifier of the application layer session.

10. The machine-readable medium of claim 8, wherein the instructions to generate an identifier for the application layer session comprise instructions to generate a one-way hash of a TLS session key or key material for the TLS session.

11. The machine-readable medium of claim 10, wherein the program code further comprises instructions to maintain a database of one-way hashes of TLS session keys or key materials paired with application layer data, wherein the instructions to indicate the identifier for tracking state of the application layer session comprise instructions to update the database with the one-way hash.

12. The machine-readable medium of claim 8, wherein the instructions to generate an identifier for the application layer session comprise instructions to pseudo-randomly generate a value as the identifier.

13. The machine-readable medium of claim 12, wherein the instructions to determine an identifier for the application layer session based on the TLS ticket comprise instructions to:
 decrypt the TLS ticket; and
 extract the value from state data within the TLS ticket.

14. The machine-readable medium of claim 13, wherein the program code further comprises instructions to copy the value into state data for constructing another TLS session ticket for a response to the client to resume the TLS session.

15. An apparatus comprising:
 a processor; and
 a machine-readable medium having instructions stored thereon that are executable by the processor to cause the apparatus to,
 track state of an application layer session across resumed transport layer security (TLS) sessions with TLS session ticketing, wherein the instructions to track state of an application layer session comprise instructions to,
  determine whether a client hello message for establishing a TLS session includes a TLS ticket;
  based on a determination that the client hello message includes a TLS ticket field with a TLS ticket when establishing the TLS session, determine an identifier for the application layer session based on the TLS ticket;
   indicate the determined identifier for tracking state of the application layer session; and
   resume the TLS session and update an entry in a database of application session identifiers with the determined identifier, wherein the entry corresponds to the application layer session;
  based on a determination that the client hello message indicates support of TLS session ticketing but does not include a TLS session ticket when establishing a TLS session, generate an identifier for the application layer session;
   indicate the generated identifier for tracking state of the application layer session;
   write an indication of the generated identifier or the generated identifier into state data of the TLS session that will be used to construct a TLS ticket;
   communicate the constructed TLS ticket to a client; and
  associate application layer data of the client communicated with the TLS session with an application layer session identifier, wherein the application layer session identifier is either the determined identifier or the generated identifier.

16. The apparatus of claim 15, wherein the instructions to determine an identifier for the application layer session based on the TLS ticket comprise instructions executable by the processor to cause the apparatus to:
- decrypt the TLS ticket;
- determine a TLS session key or key material based on state data extracted from the TLS ticket;
- generate a one-way hash of the TLS session key or key material; and
- indicate the one-way hash as the identifier of the application layer session.

17. The apparatus of claim 15, wherein the instructions to generate an identifier for the application layer session comprise instructions executable by the processor to cause the apparatus to generate a one-way hash of a TLS session key or key material for the TLS session.

18. The apparatus of claim 17, wherein the machine-readable medium further has stored thereon instructions executable by the processor to cause the apparatus to maintain a database of one-way hashes of TLS session keys or key materials paired with application layer data, wherein the instructions to indicate the identifier for tracking state of the application layer session comprise instructions to update the database with the one-way hash.

19. The apparatus of claim 15, wherein the instructions to generate an identifier for the application layer session comprise instructions executable by the processor to cause the apparatus to pseudo-randomly generate a value as the identifier.

20. The apparatus of claim 19, wherein the instructions to determine an identifier for the application layer session based on the TLS ticket comprise instructions executable by the processor to cause the apparatus to:
- decrypt the TLS ticket; and
- extract the value from state data within the TLS ticket.

* * * * *